June 2, 1970  R. A. WAGSTAFF ET AL  3,515,010
SPRING LOADED VARIABLE SHEAVE SUPPORT FOR A V-BELT DRIVE
Filed Sept. 12, 1968  3 Sheets-Sheet 3
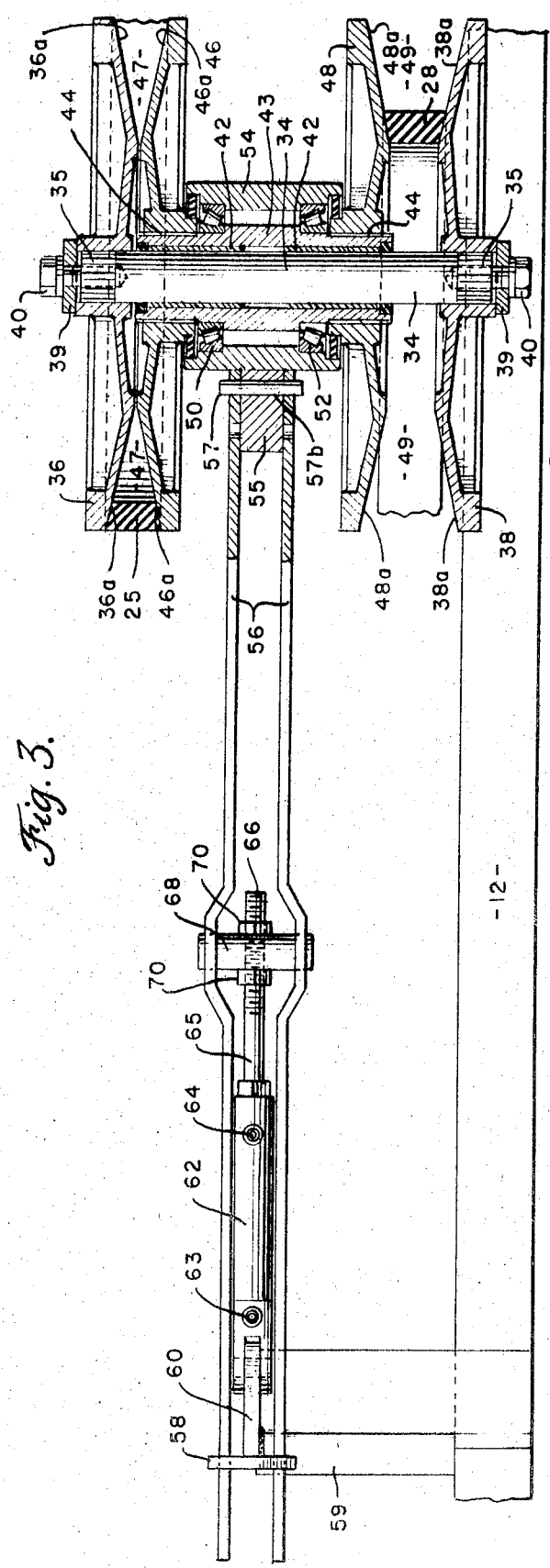
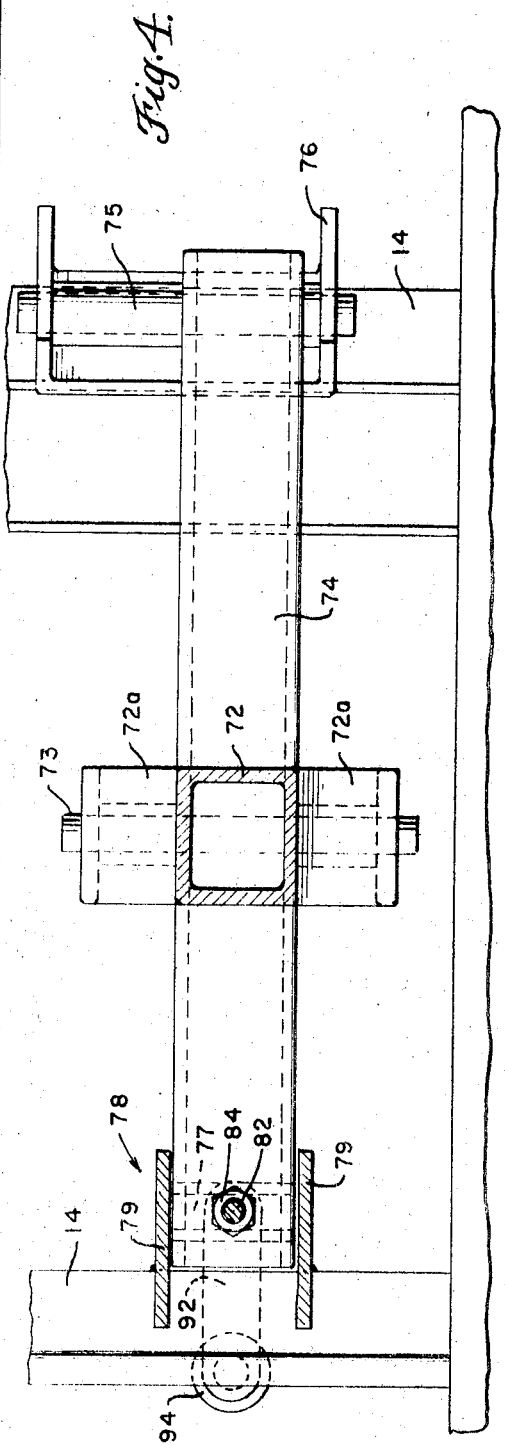
INVENTORS
ROBERT A. WAGSTAFF
& THOMAS W. WALDROP
BY
ATTORNEY

United States Patent Office 3,515,010
Patented June 2, 1970

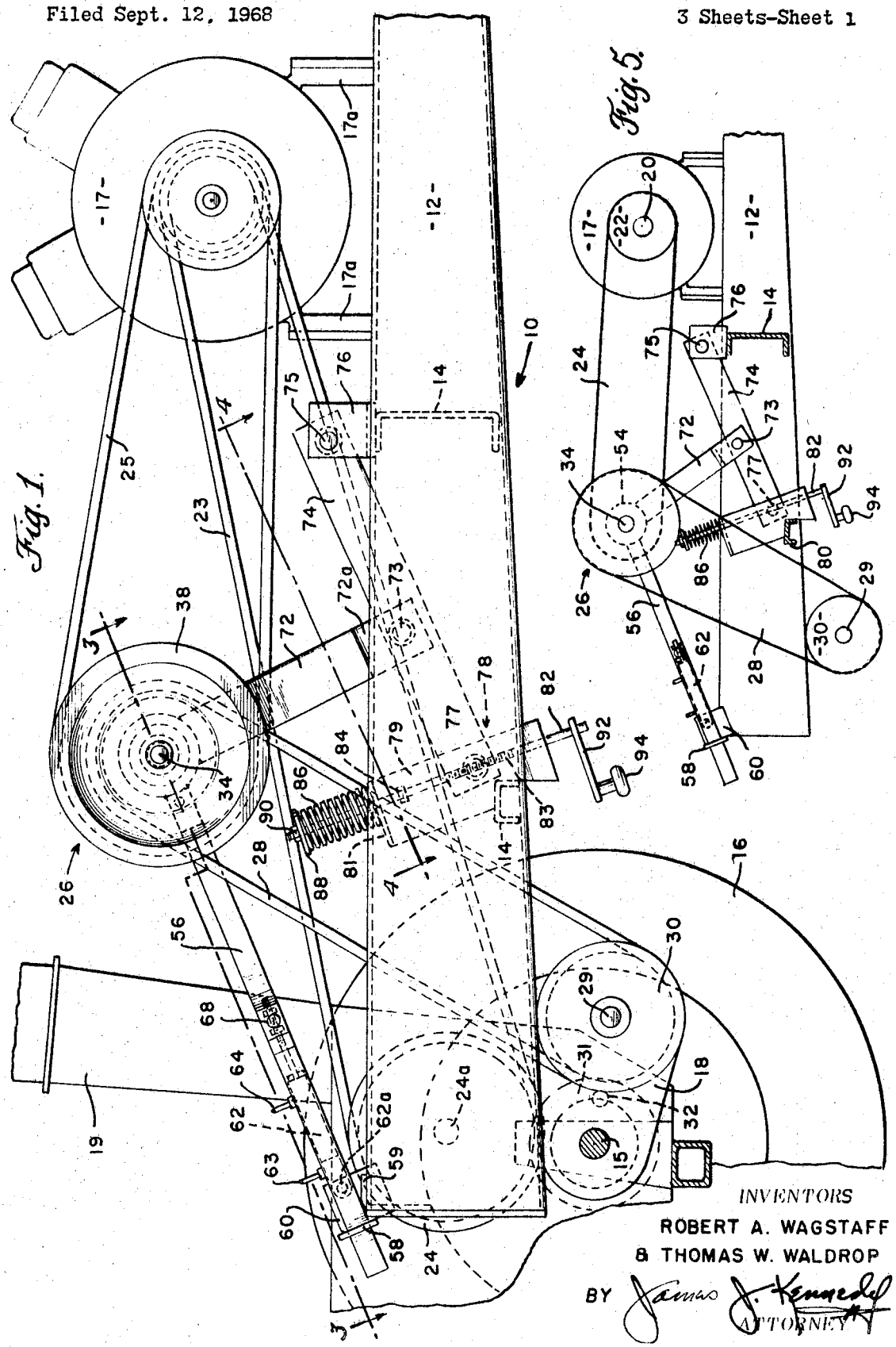

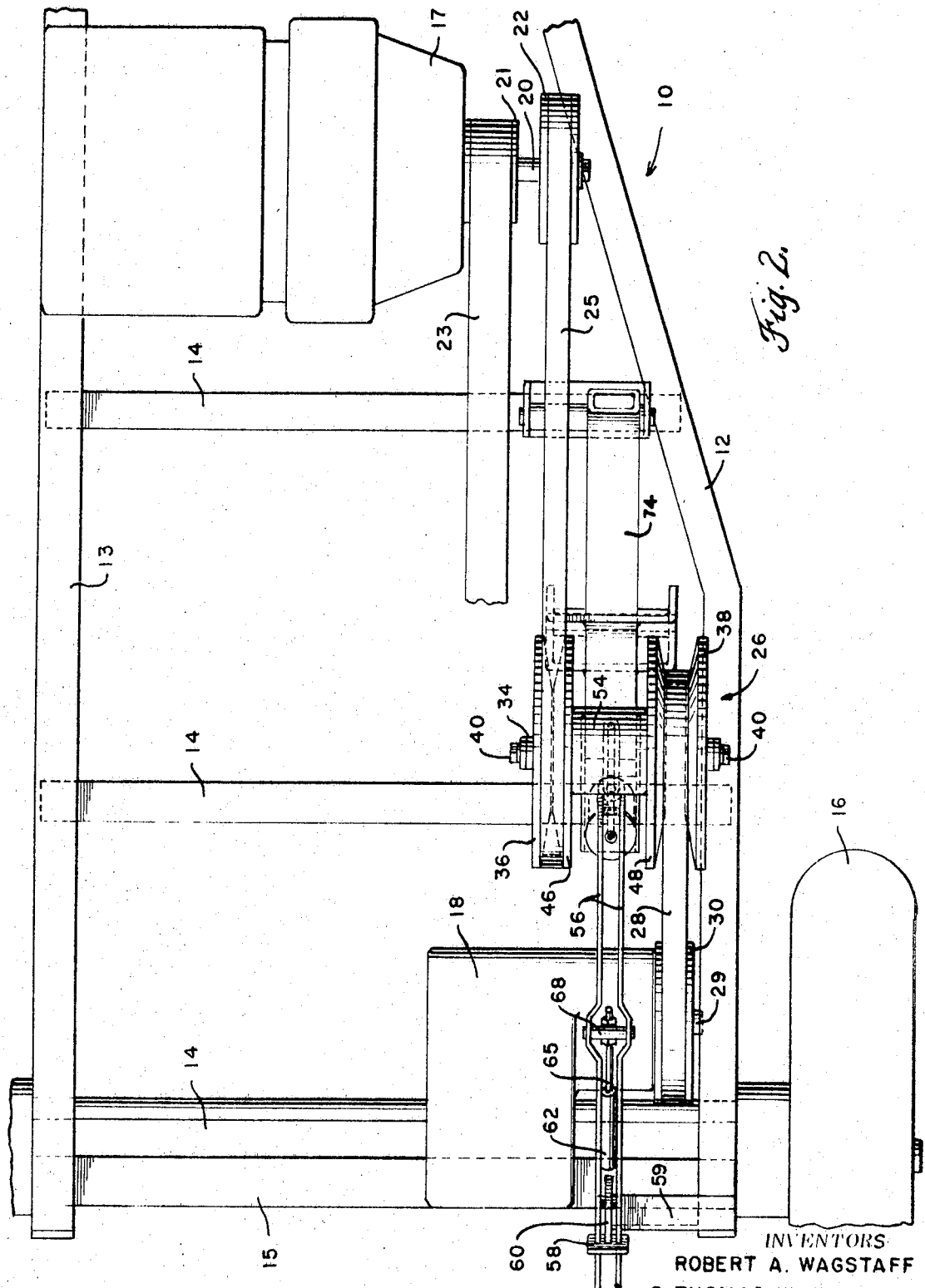

3,515,010
SPRING LOADED VARIABLE SHEAVE SUPPORT FOR A V-BELT DRIVE
Robert A. Wagstaff and Thomas W. Waldrop, New Holland, Pa., assignors to Sperry Rand Corporation, New Holland, Pa., a corporation of Delaware
Filed Sept. 12, 1968, Ser. No. 759,265
Int. Cl. F16h 55/56, 7/10
U.S. Cl. 74—230.17                                 12 Claims

ABSTRACT OF THE DISCLOSURE

A variable V-belt drive for a harvesting machine comprising a variable diameter sheave assembly, interposed between an engine and a transmission, and operable to provide a variable speed drive for each gear ratio, a pivotally mounted spring biased support mounted on the machine frame and adjustably positionable to vary the tension applied to the V-belts running between the sheave assembly and the engine and the transmission, and actuating means remotely operable to vary the diameter sizes of the sheave assembly.

BACKGROUND OF THE INVENTION

Variable speed V-belt drives have been long known in the art and especially those related to self-propelled vehicles. Over the years such drive systems have been used to provide infinitely variable speed drives for agricultural machines and particularly combines and self-propelled forage harvesters. The drive systems are generally disposed between the power source and the transmission and they serve to permit a variable speed range within each gear ratio.

The variable speed drives used as part of the drive train for agricultural machines have been both necessary and useful because the power source, or engine of the machine must not only supply power to the traction wheels through the transmission, but it must also directly supply driving power to the harvesting and crop handling mechanisms of the machines. The latter use of the machine requires a generally constant speed, while the former use of the engine requires a variable output depending on terrain, crop conditions, etc.

While the variable speed belt drive systems have been long known in the agricultural arts, they have presented some serious drawbacks inasmuch as the belts required considerable attention to keep the machine operating successfully and efficiently. Generally speaking, there have been no adequate means provided with the presently available assemblies to provide for the normal belt stretch and wear during use. As the belts slackened during normal use, the operator is required to stop his machine, get off and perform a rather complex belt tightening operation. Usually this requires a loosening of the entire assembly, moving it relative to the machine frame, and then retightening and testing the belt tightness. This whole operation is costly and time consuming to the operator and both of these factors add up to a lessening of the machines efficiency.

Further difficulties are encountered when it becomes necessary for the machine operator to replace a broken or worn out belt. Using presently available variable sheave assemblies, the elements must be disassembled before the belt can be removed, or replaced and then reassembled when the belt is replaced. Of course, the reassembly requires that the complete sheave assembly be readjusted to achieve proper belt tension. Such an operation precludes a fast field fix and from that standpoint the simple belt replacement also becomes a rather costly and time consuming exercise.

SUMMARY OF THE INVENTION

Accordingly, the primary object of the invention is to provide a variable V-belt drive sheave support assembly which is spring loaded so that the stretching of the belts due to normal wear may be taken up without constant attention by the machine operator and without shutting down the machine.

Another object of the invention is to provide a sheave support assembly frame connection means which is disposed interiorly of the sheaves to permit the removal of the belts without the need of disassembling the entire assembly.

A further object of the invention is to provide for an adjustment means in association with the spring biasing means to permit easy adjustmenet thereof from time to time.

Another object of the invention is to provide a means of removing all tension from the belts without disassembling the variable sheave assembly.

BRIEF DESCRIPTION OF THE DRAWINGS

FIG. 1 is a fragmentary side elevation view illustrating a variable sheave drive assembly constructed in accordance with the invention applied to a self-propelled forage harvester;
FIG. 2 is a plan view of FIG. 1;
FIG. 3 is an enlarged plan section taken, as indicated, by the line 3—3 in FIG. 1;
FIG. 4 is an enlarged plan view taken, as indicated, by the line 4—4 in FIG. 1; and
FIG. 5 is a diagrammatic side view on a reduced scale illustrating the assembly adjusted to a position in which the speed of drive is increased over the speed obtained when the assembly is in the position shown in FIG. 1.

DESCRIPTION OF THE PREFERRED EMBODIMENT

Referring generally to FIGS. 1 and 2, the numeral 10 generally designates a self-propelled forage harvester of the type well known in the agricultural arts and generally illustrated in U.S. Pat. 2,857,946 issued to Nikkel, Oct. 28, 1958. The harvester 10 is comprised of a frame structure including a side frame member 12, a mid frame member 13, and cross frame members 14. So that the harvester may travel over the ground, the frame is supported, in part, by an axle 15 and a wheel 16. It will be understood that other wheeels are also provided to make the harvester operational, but for the sake of clarity and because these wheels form no part of the present invention, they, accordingly, have not been shown.

Also, mounted on the frame structure of the machine is a power source, or engine 17, fixed to upstanding engine mounts 17a, and a transmission 18 mounted in spaced apart relation from the engine 17. The transmission 18 is mounted beneath the frame by any suitable means (not shown) and is drivingly connected to the axle 15 to provide a driving force thereto as the transmission is driven by engine in a manner to be more fully described in detail.

A discharge spout 19 is mounted forwardly of the harvester frame structure behind the harvesting mechanism (not shown) and is adapted to provide for discharge of forage material as the machine is operated. The engine 17 is provided with an output shaft 20 which supplies a constant power to the harvesting and crop handling mechanisms (not shown) through pulley 21, fixed to the shaft 17 for rotation therewith, and a belt 23 which extends forwardly from the engine to the harvesting, crop handling mechanisms (not shown), and cutterhead pulley 24 rotating on shaft 24a, as illustrated in FIGS. 1 and 2.

Spaced from the pulley 21, along the output shaft 17, is another drive pulley 22. A first endless V-belt drive means 25 extends forwardly from pulley 22 to a variable sheave drive assembly 26 and is adapted to provide a driving force from the engine 17 through the sheave assembly 26. A second endless V-belt drive means 28 extends from the sheave assembly 26 to a transmission input shaft 29 and its associated driven sheave 30 to supply the transmission 18 with motive power from the engine 17 through the assembly 26. From the transmission input shaft 29 the driving force is transmitted by conventional gearing means (not shown) of the transmission to a gear unit 31 for wheel drive by a transverse shaft 32 which extends between the gearbox to the wheel gear units.

The variable sheave drive assembly 26, disposed between the engine 17 and transmission 18, shown in detail in FIG. 3, is comprised of a control shaft 34, which extends generally longitudinally with respect to the harvester frame structure and is provided with splined ends 35, outer sheaves 36 and 38, having inclined inner faces 36a and 38a, respectively, a pair of bushings 42 surrounding shaft 34, a sleeve 43, surrounding the bushings 42 and provided with splined ends 44, inner sheaves 46 and 48 having inclined inner faces 46a and 48a, respectively, bearings 50 and 52 and a hub 54 mounted on the bearings 50 and 52. The shaft 34 is both rotatable and longitudinally, or axially movable in the bushings 42. The outer sheaves 36 and 38 are adapted to be received on the splined ends 35 of the shaft 34 so that the sheaves will rotate with the shaft. A washer 39 and screw means 40 are adapted to securely fasten each of the sheaves 36 and 38 to the shaft. Thus, as the shaft 34 moves longitudinally, the sheaves 36 and 38 are also moved, but the relative distance between the sheaves remains the same.

The splined outer ends 44 of the sleeve 43 are adapted to receive inner sheaves 46 and 48 so that the sleeve and its associated sheaves 46 and 48 rotate as a unit. Because of the bushings 42 interposed between the central shaft 34 and the sleeve 43, the sleeve and the shaft may rotate relative to one another.

Mounted exteriorly of the sleeve 43 and interiorly of the sleeves 46 and 48 are the bearings 50 and 52. The hub is mounted on the bearings 50 and 52 in spaced apart relation to the sleeve 43 and concentrically with shaft 34. The hub 54 is fixed against rotation, in a manner to be more fully described, relative to the sleeve or the shaft and along with the sleeve 43 is fixed to prevent longitudinal shifting thereof. The shaft 34, then, is longitudinally positionable relative to both the sleeve and the hub. By the longitudinal shifting of the shaft 34 and its associated sleeves 36 and 38 with respect to the sleeve 43 and its associated sheaves 46 and 48, grooves 47 and 49, formed between the cooperating inclined surfaces 36a–46a and 38a–48a, are caused to vary in width.

A lug 55, fixed to hub 54 by welding, or the like, is provided as a mounting means for the upward ends of arms 56. A pin 57 extends through the arms 56 and bores 57a or 57b of the lug 55, pivotally connecting the arms with respect to the hub. The arms 56 are disposed in generally parallel, spaced apart relation, as illustrated in FIG. 3, and extend generally downwardly toward the harvester frame. A bracket 59, welded to the frame member 12, extends inwardly of the frame to a point where a mounting or anchor plate 60 is welded to the end thereof. A slotted guide member 58 is welded to the forward edge of the plate 60 and is adapted to receive therethrough, in sliding engagement, the lower ends of the parallel arms 56. A hydraulic cylinder 62 is pivotally connected to the forward end of the plate 60 by means of a pin 62a. The cylinder 62, disposed between arms 56, is supplied with hydraulic fluid by lines 63 and 64 and piston rod 65 extends rearwardly between the spaced apart arms to connecting means 68 intermediate the ends of the arms 56. The outward end of rod 65 is threaded as at 66 and extends through a pin 68 which connects the arms 56. Nuts 70 are located on the threaded portion 66 of the rod, on either side of the pin, so that the hydraulic actuating means 62 is adjustably mounted with respect hereto. Actuation of cylinder 62 causes the arms 56 to move either forwardly or rearwardly with respect to the frame in guide 58.

A sheave support 72 is disposed in a generally upstanding relation to the frame structure, as shown in FIG. 1. The upper end of the support 72 is welded to hub 54, while the lower, forked end 72a is pivotally connected to an inclined lever arm 74, intermediate the ends thereof. As best illustrated in FIGS. 1 and 4, the lever 74 is pivotally connected at one end, by pin 75 disposed in bracket 76 mounted on the frame portion 14. The free end of lever 74, provided with a threaded swivel nut 77 adjacent its outer end, extends into a yoke structure 78 welded to cross frame member 14. The support 72 and lever 74 cooperate to form a pivotal support means for the sheave assembly 26.

The yoke 78 is comprised of a pair of parallel, spaced apart, upwardly extending arms 79 and a bight portion 81 connecting the legs at the upper end thereof. Extending upwardly through the yoke 78 and the swivel nut 77 is a rod 82. The rod 82 is threaded, as indicated by 83 in FIG. 1, so as to be threadably engageable with the swivel nut 77. The upper end of the rod extends upwardly beyond the bight portion 81 of yoke 78, through a coil spring biasing means 86 to a retaining plate 88 and a nut 90. The bight portion 81, plate 88 and nut 90 cooperate to retain the spring in a concentric relation to the rod so that rod 82 may be threadably adjusted in nut 77 to place a biasing force on the pivotal support means. The nut 84, disposed on rod 82 beneath bight portion 81, limits the expansion of spring 86 as tension is relieved from the belts 25 and 28. Once the bolt 84 engages the bight portion 81 and the crank 92 is turned further to release the tension on the belts, the lever 74 is then driven downwardly by the cooperation of the threaded portion 83 and swivel nut 77 until all tension on the belts is released. By turning the crank in the opposite direction, tension may be re-applied. The correct amount of tension required for the belts may be gauged by the distance between the crank arm 92 and the bottom portion of yoke arm 79.

A hand crank 92 having a handle, or knob 94 is fixed to the lower end of rod 82 to permit rotation thereof. By turning the crank 92 in either direction, the amount of tension applied to the belts 25 and 28 through the pivotal support means may be easily adjusted. Thus, normal belt stretch due to wear may be easily taken up by the biasing means as it acts through the pivotal support means against the endless drive mean. There is no need to shut the machine down during this operation, because the adjustment means can operate just as easily on running belts as on belts which are not running.

In operation, each transmission gear ratio may, theoretically at least, have an output speed which is infinitely variable. Practically there is no real need to have an infinite speed range for each gear range. The output speed for each gear may be determined by the operator from a remote position depending on crop conditions, terrain, etc. The speed variation is achieved by changing the effective diameters of the sheaves in the sheave assembly 26. As indicated in FIG. 1, the V-belt 25, being driven by the engine, rides in groove 47 formed between sheaves 36 and 46. In this position, the width of the groove 47 is at its narrowest point and the belt 25 is riding in the groove at its furthest distance from the axis of shaft 34. The groove 49, formed between sheaves 38 and 48, is shown in its widest position and the belt 28 is riding deep in the groove in its closest position to the shaft axis. Through this relationship, each of the sheaves 36, 47, 38 and 38 is being driven by the belts. The wedging action of belt 28 deep in groove 49 causes the shaft 34 and its associated sheaves to shift longitudinally (toward the bottom of the sheet when viewing FIG. 3), and at the same time, wedging action of the belts on the inner sheaves 46 and 48 causes the sleeve 43 to turn with shaft 34.

To increase the output speed through the sheave assembly, the diameters of the cooperating sheaves 36-46 and 38-48 must be changed towards a position similar to that shown schematically in FIG. 5, for example. The shift in position is accomplished by activating the hydraulic cylinder 62, causing the arms 56 to draw the sheave assembly 26 forwardly toward the transmission. In so doing, the sheave assembly is caused to pivot on support 72 with respect to lever 74 because of the pin connection 73 thereto. As the sheave assembly is forced forwardly, the tension applied on the belt 28 by the driven pulley 30 and the position of sheaves 38-48, is lessened because the entire assembly 26 is moving closer to the driven pulley 30. At the same time the tension applied to belt 25 through the driving pulley 22 and the sheaves 36-46 is increased as the assembly 26 moves further from the engine. This simultaneous loosening and tightening of the belts causes the shaft 34 and its associated sheaves 36 and 38 to shift to a position opposite to that shown in FIG. 1, to the position shown in FIG. 5. The wedging action of belt 25 as it is drawn tighter causes it to move deeply into the groove 47 so that it assumes a position closer to the axis of shaft 34. The slackened belt 28 moves to a position within groove 49 which increases the distance between it and shaft axis. In each case the shaft and sleeve rotate because of the friction of the belts against the inclined faces 36a-46a and 38a-48a. In this way the diameters of the sheave assembly 26 are changed causing a corresponding increase or decrease in the speed directed to the turning of transmission input shaft 29.

During the entire operation of the speed change, the spring biased pivotal support maintained a constant tension on the belts to insure correct operating conditions by taking up the slack in the belts which arises from normal operation. As further wear or stretching occurs, the operator need only turn the crank arm 92 to again achieve the optimum operating conditions. If it becomes necessary to replace a belt, then this operation too is simplified, since all the operator need do is turn the crank handle until all the tension is removed, slip the worn belt out of the sheaves, replace it with another and crank the handle back until the proper tension is applied. There is no need for the operator to disassemble the sheave assembly to remove the belts or to tighten them because the support means is mounted between the sheaves, fixed to the hub, rather than being fixed to the shaft ends.

While this invention has been described in connection with a single embodiment thereof, it will be understood that it is capable of modification, and this application is intended to cover any variations, uses, or adaptations following, in general, the principles of the invention and including such departures from the present disclosure as come within the known or customary practice in the art to which the invention pertains, and as fall within the scope of the invention.

Having thus described our invention, what we claim is:

1. A V-belt drive for a harvesting machine comprising:
   a wheeled frame movable over the ground;
   a driving means on said frame;
   a driven means on said frame spaced from said driving means;
   a variable diameter sheave assembly, having a plurality of spaced apart sheave pairs, disposed intermediate said driving and driven means;
   first endless drive means interconnecting said driving means and said sheave assembly;
   second endless drive means interconnecting said sheave assembly and said drive means;
   pivotal support means fixed to said sheave assembly;
   biasing means connected to said pivotal support means for applying tension to said first and second endless drive means through said support means and said sheave assembly; and
   actuating means on said frame comprising a pair of generally parallel, spaced apart arms extending between said frame and said sheave assembly and means between said arms and connected to said frame and said arms for moving said arms relative to said frame and operable against said sheave assembly for varying the diameters thereof.

2. A V-belt drive, as recited in claim 1, wherein said pivotal support means comprises a lever pivotally connected to said frame, a sheave support, having upper and lower ends, said sheave support being fixed by the upper end thereof to said sheave assembly intermediate said sheave pairs and pivotally connected intermediate the lever ends at the lower end thereof.

3. A V-belt drive, as recited in claim 2, wherein said lever is pivotally connected by one end thereof to said frame and is adjustably connected to said biasing means at the other end thereof, said lever being adjustably positionable with respect to said frame by said biasing means.

4. A V-belt drive, as recited in claim 1, wherein said biasing means comprises bracket means fixed to said frame and upstanding therefrom, a rod adjustably engageable with said pivotal support means and extending through said bracket means, retaining means at one end of said rod, and biasing means between said bracket means and said retaining and surrounding said rod.

5. A V-belt drive, as recited in claim 4, wherein said biasing means comprises a spring and said rod is provided with a hand crank for adjusting said rod with respect to said pivotal support whereby the biasing force of said spring is transmitted through said rod to said pivotal sheave support, to said sheave assembly and finally to said first and second endless drive means applying tension thereto.

6. A V-belt drive, as recited in claim 1, wherein said means between said arms includes a hydraulic cylinder disposed between said arms and connected to said frame at one end and to said arms at the other end, intermediate the ends of said arms.

7. A V-belt drive, as recited in claim 6, wherein said arms extend through a slotted guide fixed to said frame, said arms moving relative to said frame in response to actuation of said cylinder to move said sheave assembly and change the diameters thereof by simultaneously applying increased and decreased tension to the endless drive means.

8. A V-belt drive for a harvesting machine comprising:
   a wheeled frame movable over the ground;
   a driving means on said frame;
   a driven means on said frame, spaced from said driving means;
   a variable diameter sheave assembly disposed intermediate said driving and driven means and including a longitudinally movable, rotatable shaft, and sheaves on the outer ends of said shaft for rotation and longitudinal movement therewith;
   first endless drive means interconnecting said driving means and said sheave assembly;
   second endless drive means interconnecting said sheave assembly and said driven means;
   pivotal support means fixed to said sheave assembly; and
   actuating means on said frame comprising a pair of generally parallel spaced apart arms extending between said frame and said sheave assembly and hydraulic means between said arms and connected to said frame and said arms for moving said arms relative to said frame and operable against said sheave assembly for varying the diameter thereof.

9. A V-belt drive, as recited in claim 8, wherein said variable diameter sheave assembly further includes a bushing surrounding said shaft, a sleeve surrounding said bushing, sheaves fixed to the outer ends of said sleeve, bearing means spaced along said sleeve and hub means surrounding said bearing means.

10. A V-belt drive, as recited in claim 9, wherein said hub means is fixed against rotation by said actuating means and said support means.

11. A V-belt drive, as recited in claim 9, wherein said shaft and said sheaves at the outer ends thereof are longitudinally movable and rotatable with respect to said sheaves fixed to the outer ends of said sleeve.

12. A V-belt drive, as recited in claim 11, wherein said sheaves on said sleeve ends have inclined inner faces and said sheaves on said shaft ends also have inclined inner faces, said faces cooperating to form an endless drive means retaining grooves, the depth of said grooves varying as said shaft and the associated sheaves move relative to said sleeve and the associated sheaves.

References Cited

UNITED STATES PATENTS

| | | | |
|---|---|---|---|
| 2,235,122 | 3/1941 | Shaw | 74—230.17 |
| 2,585,732 | 2/1952 | Braman | 74—230.17 |
| 2,813,433 | 11/1957 | Adams | 74—230.17 XR |
| 2,942,447 | 6/1960 | Rickel | 74—230.17 XR |
| 3,109,315 | 11/1963 | Luenberger | 74—230.17 |
| 3,364,766 | 1/1968 | Ramo | 74—230.17 |

JAMES A. WONG, Primary Examiner

U.S. Cl. X.R.

74—242.15